July 15, 1952
N. A. LEASH
2,603,253
BOX LID MAKING MACHINE
Filed July 14, 1947
10 Sheets-Sheet 2
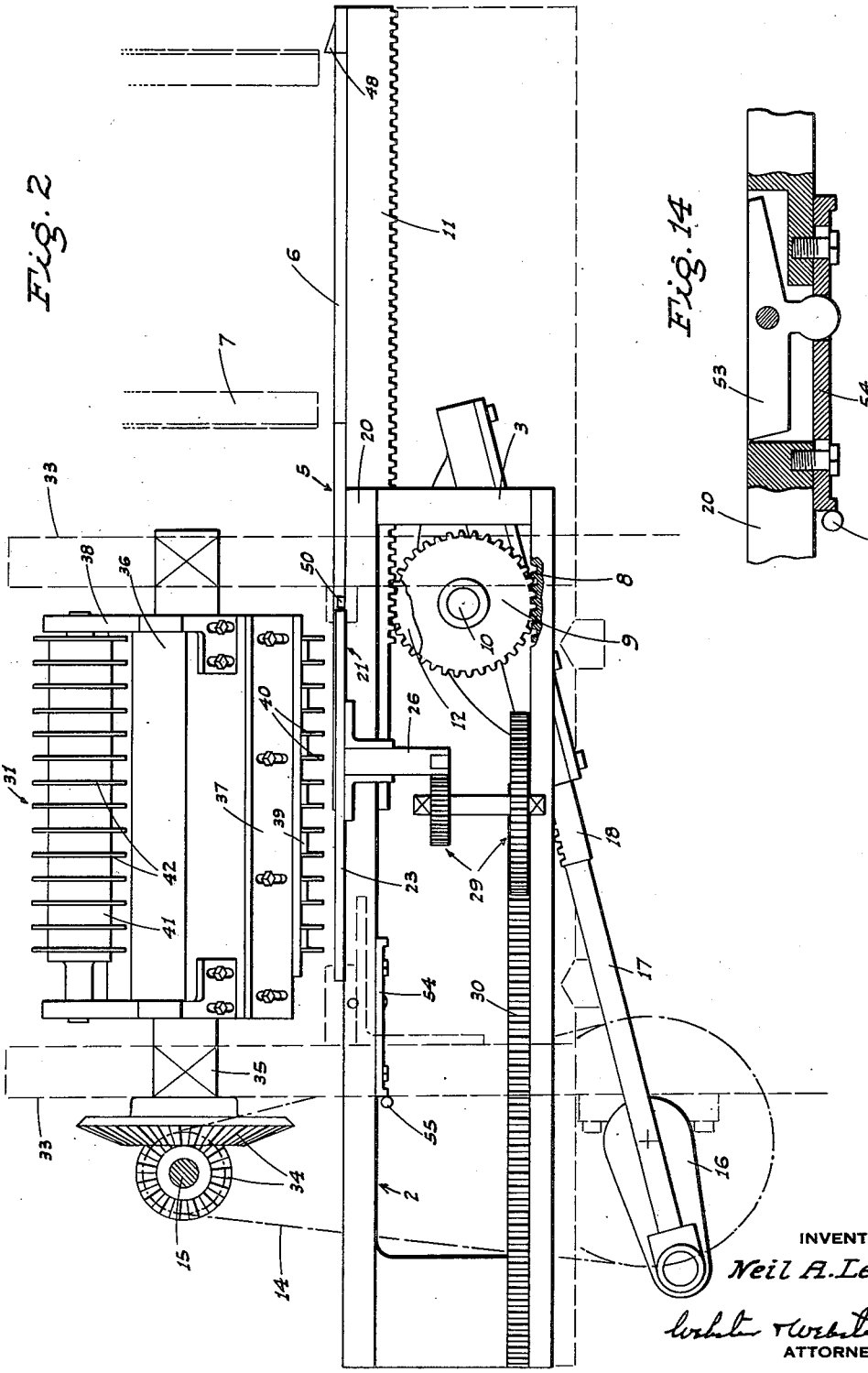
INVENTOR
*Neil A. Leash*
*Webster & Webster*
ATTORNEYS July 15, 1952 — N. A. LEASH — 2,603,253
BOX LID MAKING MACHINE
Filed July 14, 1947 — 10 Sheets-Sheet 3
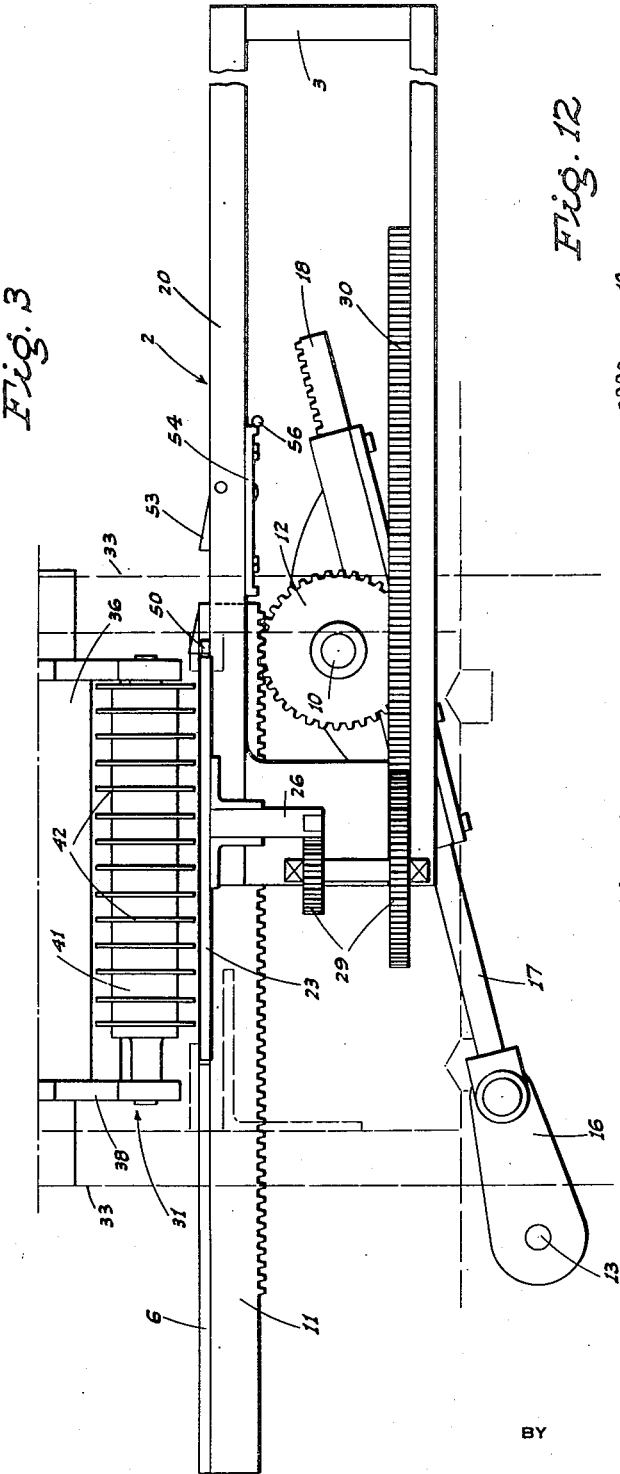
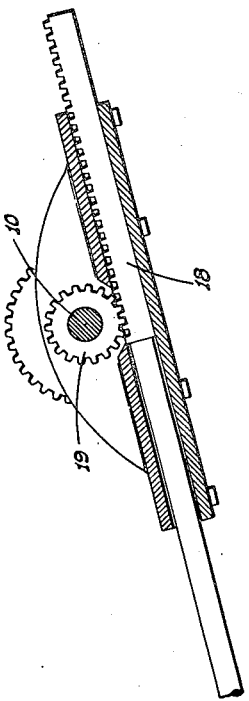
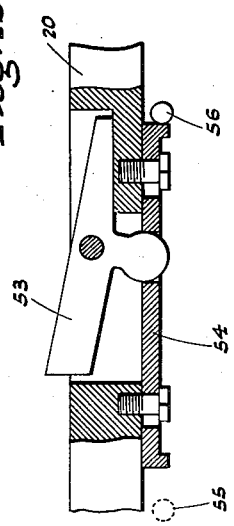
INVENTOR
Neil A. Leash July 15, 1952

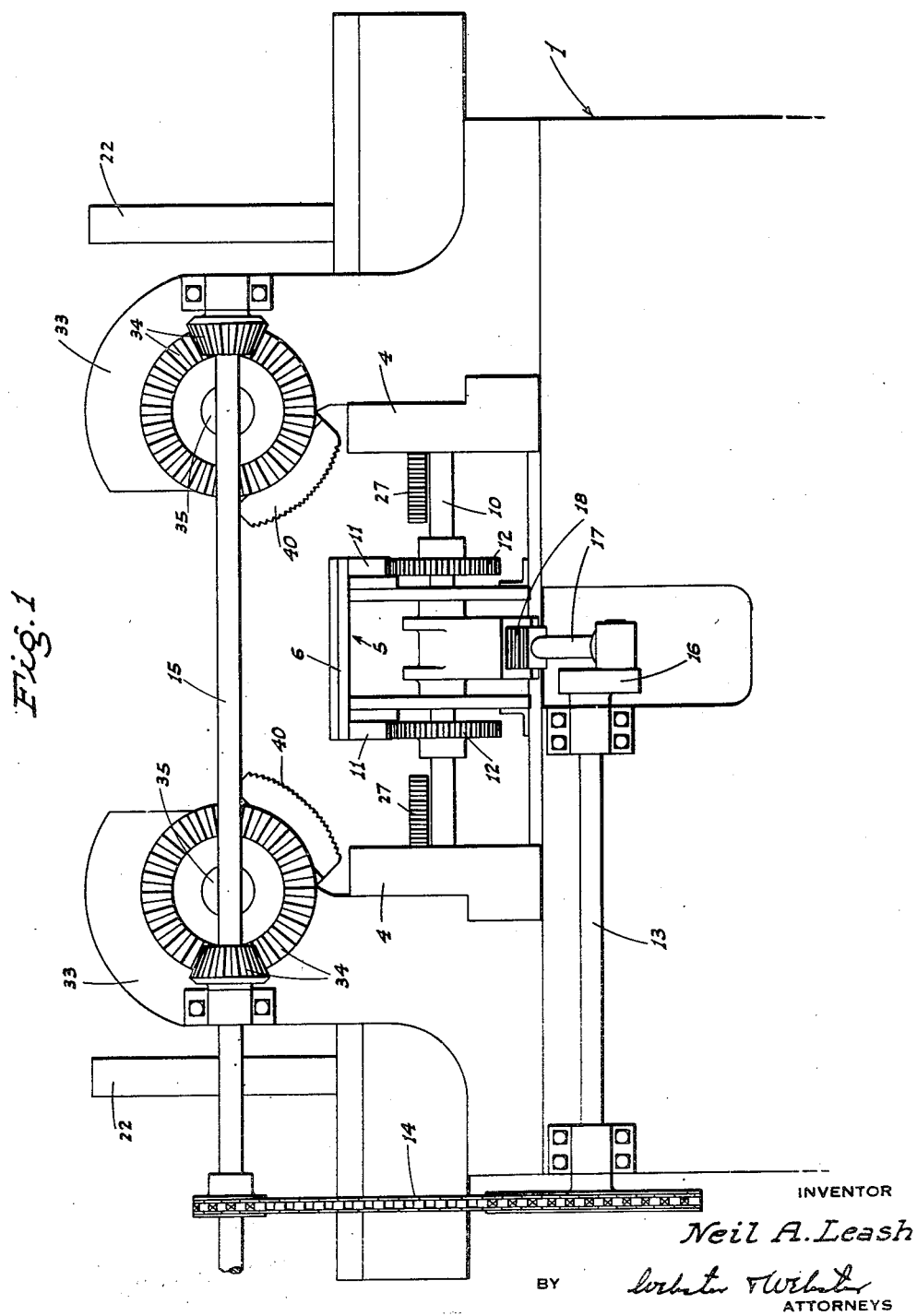

N. A. LEASH 2,603,253

BOX LID MAKING MACHINE

Filed July 14, 1947

INVENTOR
Neil A. Leash

BY

ATTORNEYS

July 15, 1952  N. A. LEASH  2,603,253
BOX LID MAKING MACHINE
Filed July 14, 1947  10 Sheets-Sheet 6

INVENTOR
Neil A. Leash
BY
ATTORNEYS

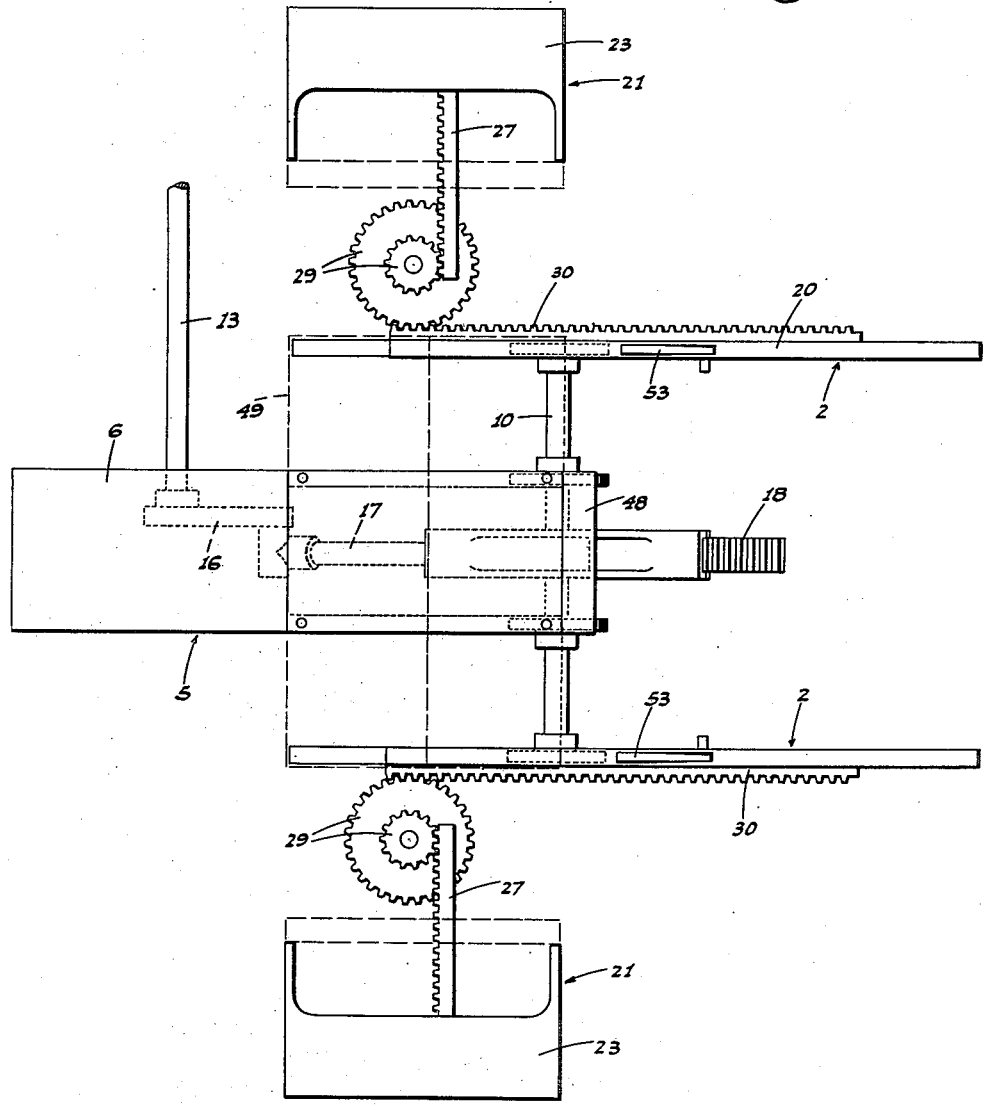

July 15, 1952 — N. A. LEASH — 2,603,253
BOX LID MAKING MACHINE
Filed July 14, 1947 — 10 Sheets-Sheet 8
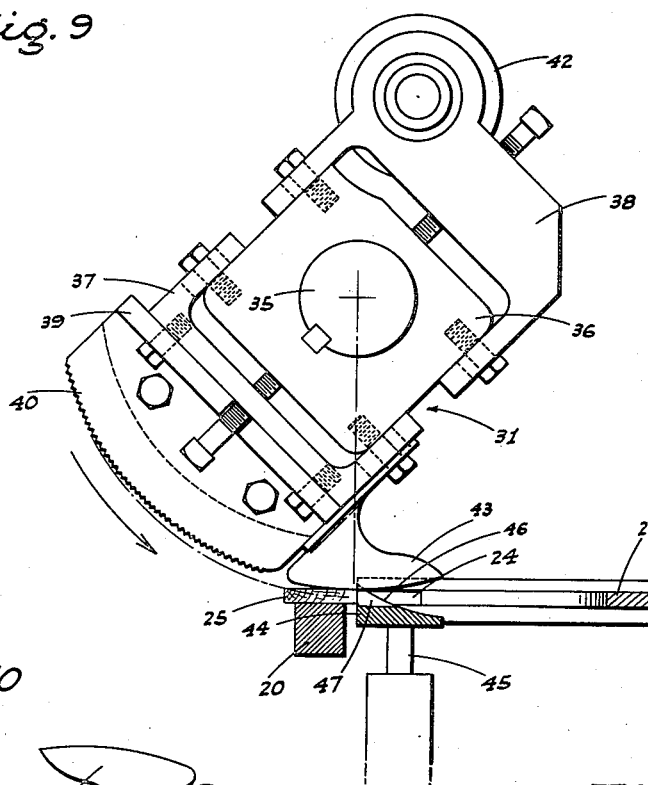
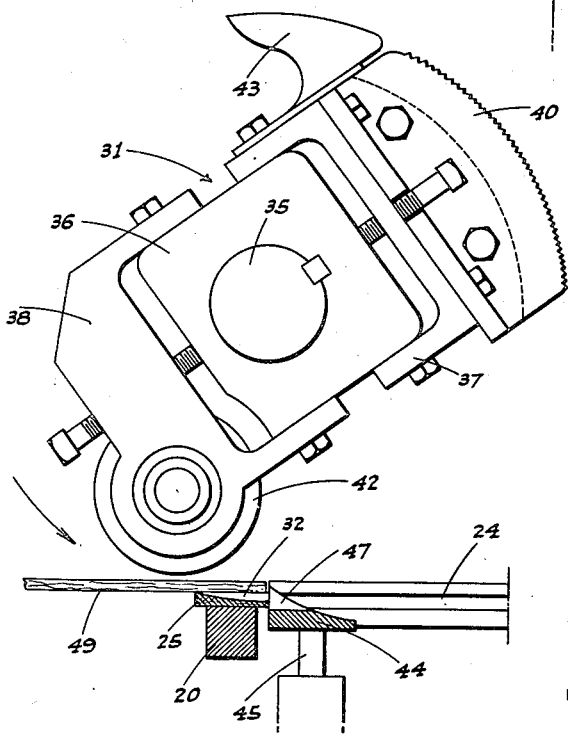
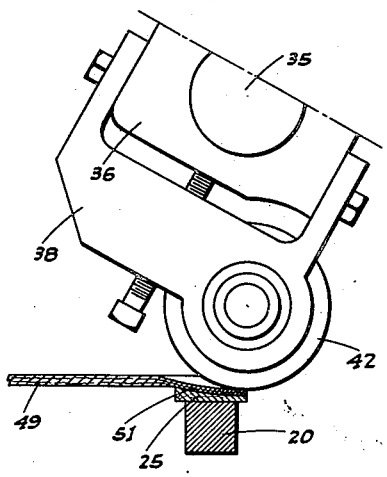
INVENTOR
Neil A. Leash

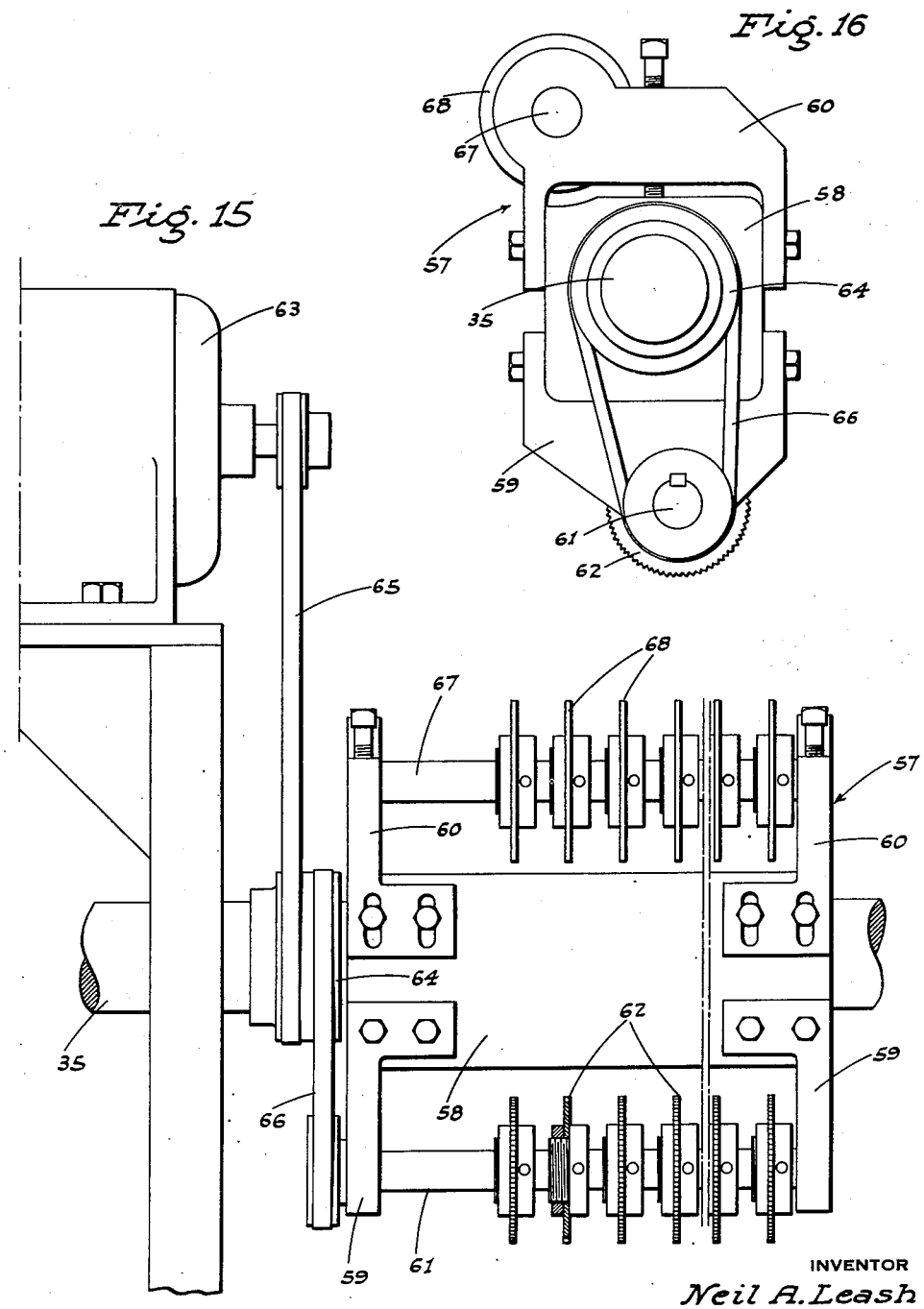

July 15, 1952   N. A. LEASH   2,603,253
BOX LID MAKING MACHINE
Filed July 14, 1947   10 Sheets-Sheet 10
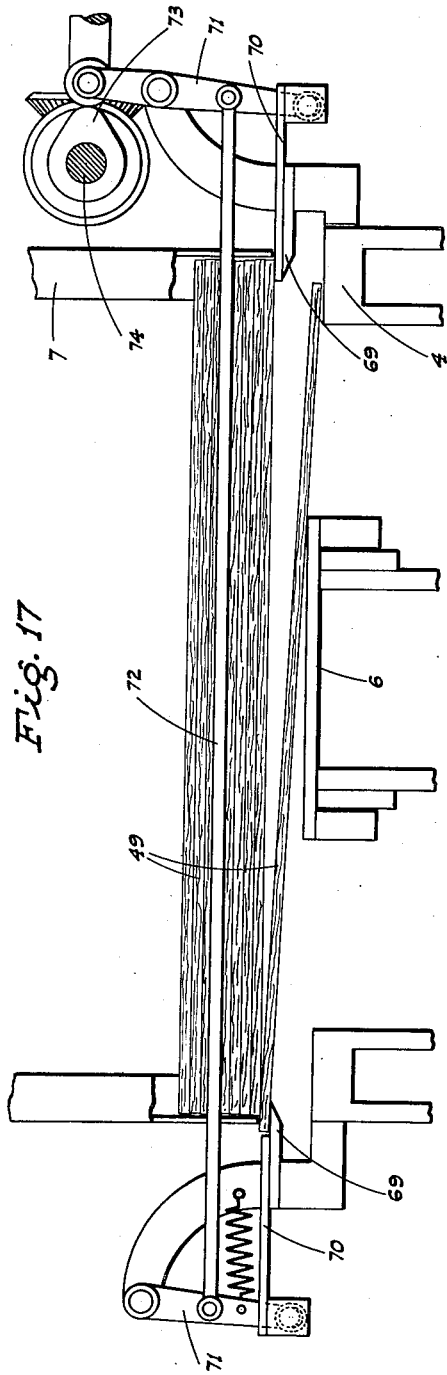
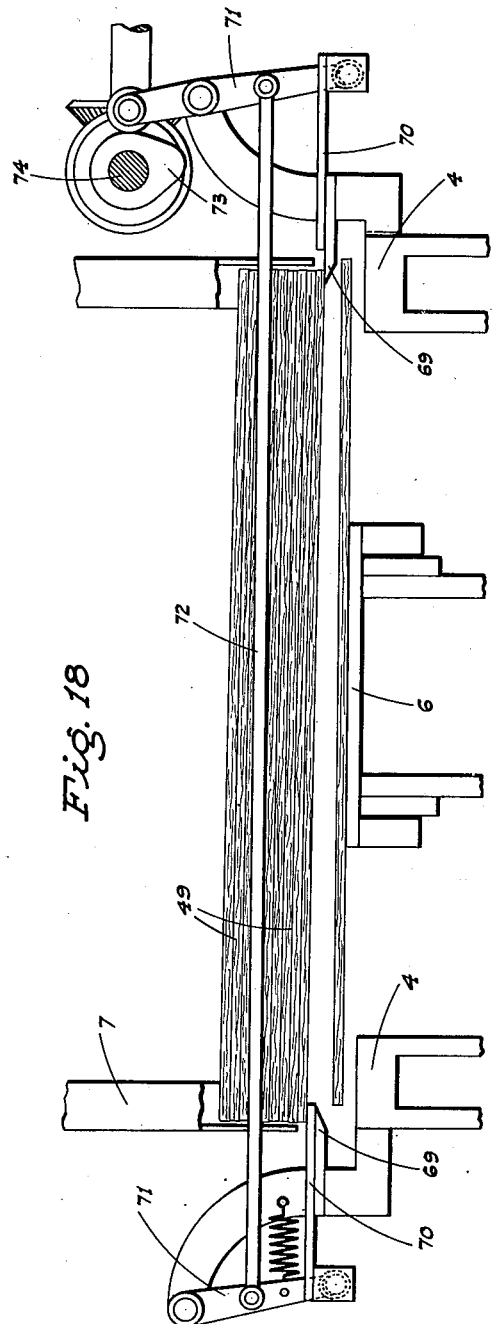
INVENTOR
*Neil A. Leash*
BY
ATTORNEYS Patented July 15, 1952

2,603,253

UNITED STATES PATENT OFFICE 2,603,253

BOX LID MAKING MACHINE

Neil A. Leash, Stockton, Calif., assignor to Stockton Box Company, Stockton, Calif., a corporation of California Application July 14, 1947, Serial No. 761,366

14 Claims. (Cl. 144—7)

1

This invention is directed to, and it is an object to provide, a novel, box lid making machine.

Another object of the invention is to provide a machine which is especially designed to manufacture the box lid shown in copending application, Serial No. 544,776, now Patent No. 2,463,982, wherein the lid comprises thin, flat shooks or slats attached to end cleats by a multiplicity of tongues deformed from the slats into pre-formed transverse grooves in the end cleats.

An additional object of this invention is to provide a box lid making machine which includes, in novel combination with a supporting assembly on which each lid is fabricated, end cleat feed units operative to feed cleats onto the supporting assembly in spaced relation, and a slat feeding mechanism operative to feed slats onto the spaced cleats to form a lid; there being unique rotary saw and roller units arranged to saw the transverse grooves in the end cleats—before placement of the slats—to deform corresponding portions of the slats into the grooves—after placement of said slats—to complete the box lids formed by said end cleats and slats.

A further object of the invention is to provide a box lid making machine, as in the preceding paragraph, wherein the cleat feeding units, slat feeding mechanism, and rotary saw and roller units all run in predetermined timed or sequential relation to each other, whereby the machine is wholly automatic in operation, and all of these parts move in relation to the lid supporting assembly without interfering one with the other.

It is also an object to provide a box lid making machine, as above, in which the box lid supporting assembly is a reciprocating structure, timed relative to the remainder of the parts in a manner such that upon completion of a box lid, said lid supporting assembly feeds forward to deliver such lid from the machine and thence returns to normal starting position for fabrication thereon of the next box lid.

A further object of the invention is to provide a practical, smooth running, automatic machine for the manufacture, in large volume, of box lids, and one which will be exceedingly effective for the purpose for which it is designed.

These objects are accomplished by means of such structure and relative arrangement of parts as will fully appear by a perusal of the following specification and claims.

In the drawings:

Fig. 1 is a discharge end elevation of the box lid making machine.

2

Fig. 2 is a diagrammatic side elevation with the slat feeding mechanism fully retracted.

Fig. 3 is a similar view, but shows the slat feeding mechanism advanced.

Fig. 7 is a diagrammatic plan view corresponding to Fig. 5.

Fig. 9 is a fragmentary cross section showing one rotary saw and roller unit with the same about to make a grooving cut.

Fig. 10 is a fragmentary cross section showing one of the rotary saw and roller units about to make a slat pressing or deforming operation.

Fig. 11 is a fragmentary cross section showing such deforming operation.

Fig. 12 is a sectional elevation of the drive mechanism taken on line 12—12 of Fig. 5.

Fig. 13 is an enlarged fragmentary sectional elevation of the push-out dog of the lid supporting assembly in upstanding position.

Fig. 14 is a similar view, but shows the push-out dog in its down or lowered position.

Fig. 15 is a side elevation of a modified form of the rotary saw and roller unit.

Fig. 16 is an end elevation of the same.

Fig. 17 is an elevation of the slat release mechanism which is associated with the slat hopper; said mechanism being in one working position.

Fig. 18 is a similar view, but shows the slat release mechanism in its other working position.

Figure 4:
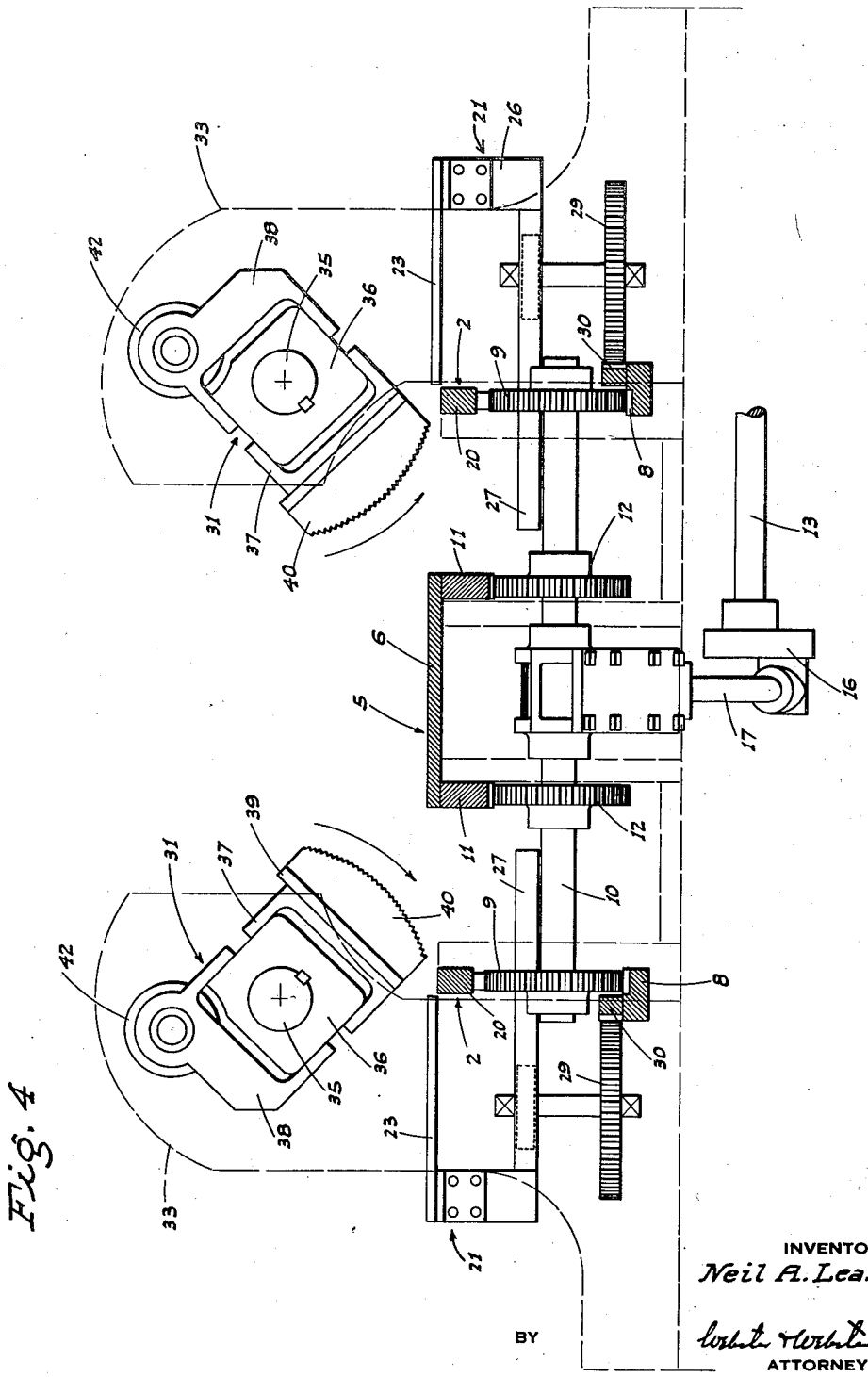
Fig. 4 is a diagrammatic cross section with the cleat feeding units fully advanced, and just before the saws of the rotary saw and roller units make their cut.
Figure 5:
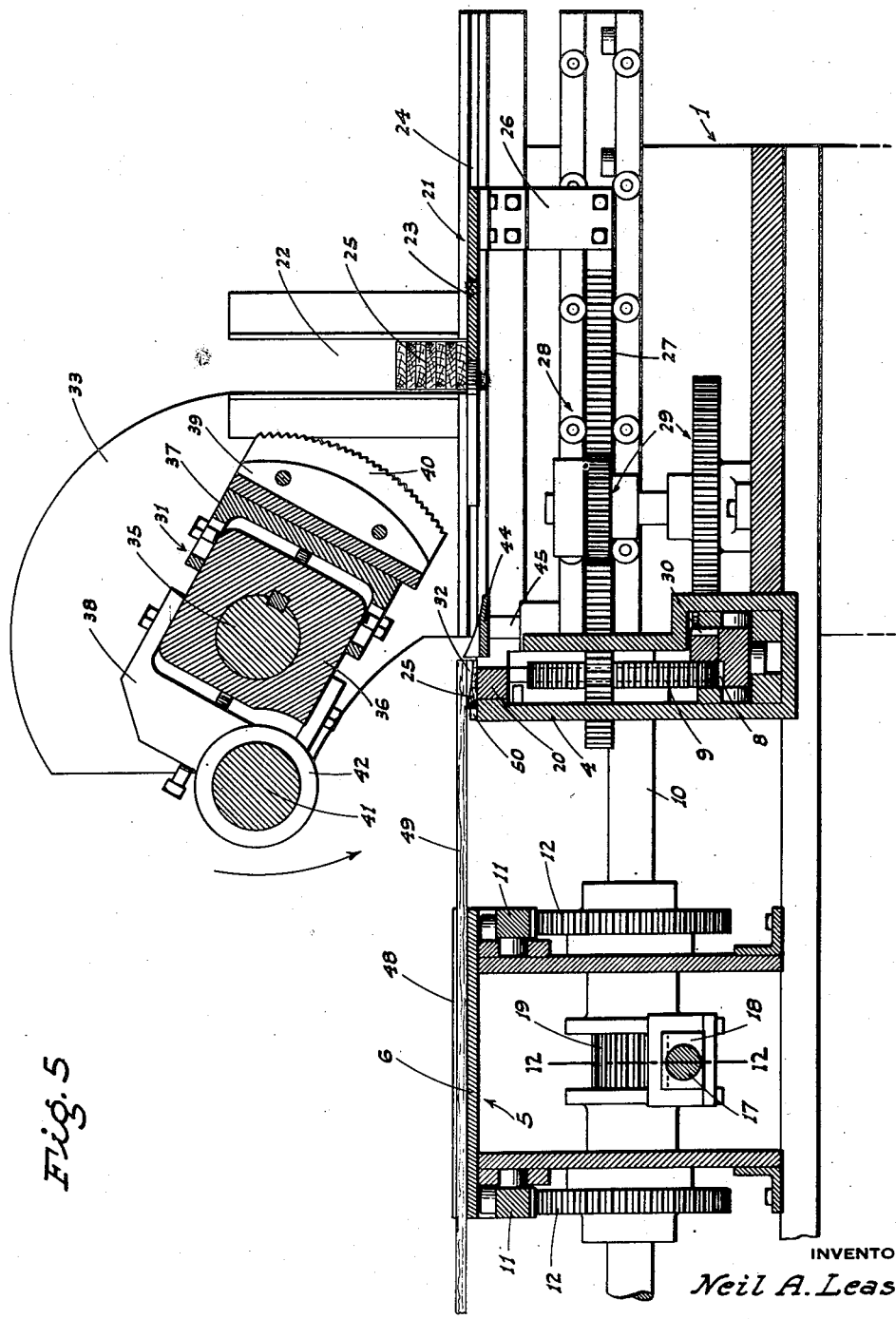
Fig. 5 is a fragmentary cross section showing the position of the parts after the cleats have been saw grooved; the cleat feeding units retracted; and as the slats are being fed into place.
Figure 6:
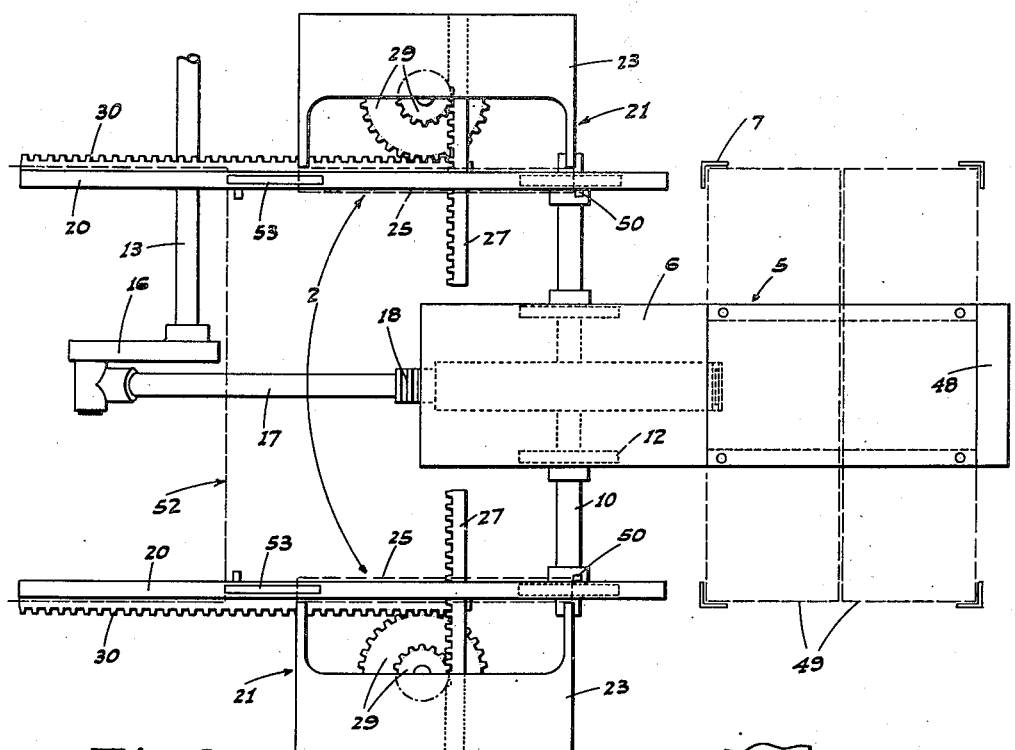
Fig. 6 is a diagrammatic plan view corresponding to Fig. 2.
Figure 8:
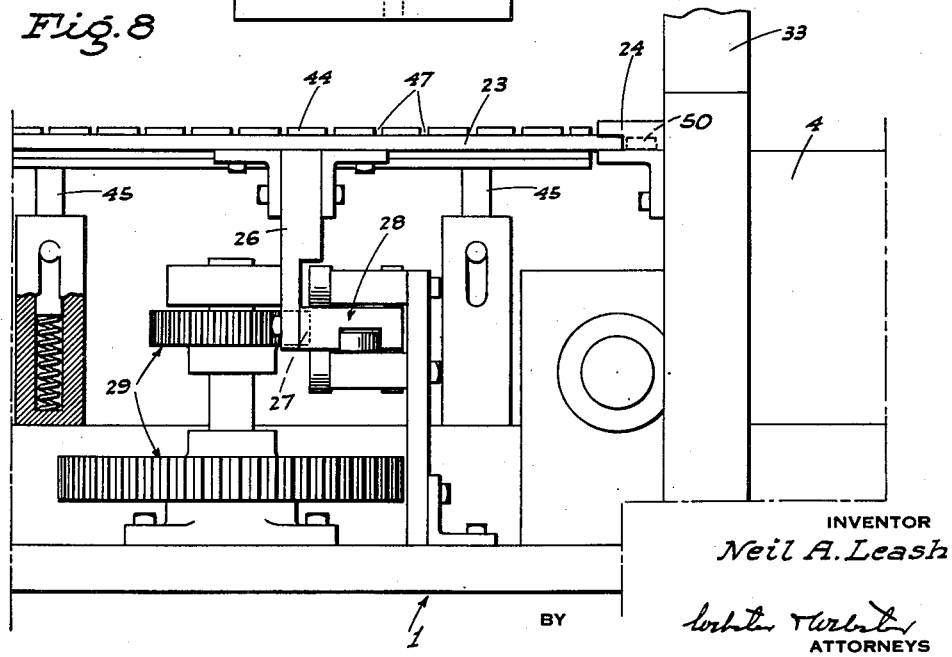
Fig. 8 is a fragmentary side elevation showing one of the cleat feeding units.

Referring now more particularly to the characters of reference on the drawings, the box lid making machine for fabricating box lids as shown in the aforesaid copending application, and by the method described therein, comprises a fixed, upstanding main frame, indicated generally at 1, and the working parts are carried on this main frame for movement by means shown diagrammatically in certain instances for clarity of disclosure.

A supporting and discharge assembly, upon which each lid is fabricated, is shown generally at 2, and comprises a pair of transversely spaced, longitudinally extending, upstanding frames 3;

each running in roller supported and guided relation in longitudinal guide housings 4 mounted horizontally on the main frame 1 in transversely spaced relation.

Centrally between the longitudinal guide housings 4, and extending slightly thereabove, the machine includes a longitudinally reciprocable slat feeding mechanism, indicated at 5, which mechanism includes a table 6 mounted to run lengthwise from between a retracted position below a slat hopper 7 to an advanced position between the guide housings 4.

The transversely spaced slide frames 3, of the supporting and discharge assembly 2, each include an upwardly facing bottom rack bar 8 meshing with gears 9 on a cross shaft 10; while the slat feeding mechanism 5 includes a transversely spaced pair of downwardly facing, longitudinal rack bars 11 running in mesh with other gears 12 on said shaft 10. It will thus be seen that with rtoation of the shaft 10 in one direction, the supporting and discharge assembly 2 advances, while the slat feeding mechanism 5 retracts. Upon reverse rotation of the cross shaft 10, the supporting and discharge assembly 2 retracts, while the slat feeding mechanism 5 advances. In other words, these parts work or travel in opposition to each other upon rotation of the cross shaft 10, which is reversibly actuated as follows:

A driven cross shaft 13 is journaled on the main frame 1 below the guide housings 4, and is driven from its outer end by an endless chain and sprocket unit 14 coupled to a transverse drive shaft 15.

At its inner end and centrally between the longitudinal guide housings 4, but below the same, the driven cross shaft 13 is fitted with a crank 16 which actuates an upwardly and rearwardly inclined connecting rod 17 having a slide rack 18 rockably supported from the cross shaft 10; said slide rack meshing with and driving a pinion 19 on said cross shaft. In this manner rotation of the driven cross shaft 13 reciprocates the slide rack 18 and reversibly operates the cross shaft 10 to cause opposed reciprocation of the supporting and discharge assembly 2 and slat feeding mechanism 5.

The slide frames 3 of the supporting and discharge assembly 2, upon which each lid is fabricated, include top bars 20 which are exposed at the top of the longitudinal guide housings 4.

On opposite sides of the lid supporting and discharge assembly 2 the machine includes cleat feeding units, indicated generally at 21, adapted to feed a pair of lid end cleats from upstanding cleat hoppers 22 laterally inwardly simultaneously, and in predetermined timed relation to movement of the other parts, as will hereinafter appear, onto the corresponding top bars 20.

As the cleat feeding units 21 are each of like construction, a description of one will suffice for both.

Each such cleat feeding unit 21 comprises a cleat feeding plate 23 mounted for reciprocating motion, transversely of the machine but laterally out from the adjacent top bar 20, by means of side channels 24. The end cleat hoppers 22 are so arranged that the cleats 25 as picked up one at a time upon reciprocation of the cleat feeding plate 23, fall into and are fed forwardly in the channels 24 to deposit on top of the corresponding top bar 20 of the adjacent slide frame 3 of the supporting and discharge assembly 2.

The cleat feeding plate 23 is supported by a post 26 affixed at its lower end to a transverse rack bar 27 roller-supported in a guide or trackway 28 mounted in connection with the main frame. The transverse rack bar 27 is reciprocated by means of a vertical axis gear and pinion unit 29, whose gearing runs in mesh with a longitudinally extending side rack bar 30 of the corresponding slide frame 3. With this arrangement it will be seen that longitudinal motion of such corresponding slide frame 3 is translated into transverse reciprocation of the rack bar 27 and the corresponding cleat feeding plate 23, whereby cleats 26 are fed by the units 21 simultaneously and successively from each hopper 22 laterally inward to a position, as previously described, on the corresponding top bars 20.

The timing relationship, by reason of the described driving mechanism, is such that the reciprocating cleat feeding units 21 act to deposit a pair of cleats 25 onto the top bars 20 when the supporting and discharge assembly 2 approaches fully advanced position, and the slat feeding mechanism 5 approaches fully retracted position.

As such pair of cleats are deposited on the top bars 20, and at the instant that the crank 16 reaches dead center with the slide frames 3 fully advanced and stopped before starting their return movement, a pair of rotary saw and roller units, indicated generally at 31, mounted above and adjacent such pair of fed cleats, sweep across the latter from inwardly thereof to cut a plurality of transverse, longitudinally spaced grooves in said cleats from the top thereof, as shown at 32. The rotary saw and roller units 31, and the cooperating parts, are constructed and mounted as follows:

A pair of spaced, upstanding brackets 33 are mounted on the main frame 1 adjacent, and projecting above, each of the longitudinal guide housings 4, and the drive shaft 15 extends horizontally, transversely of the machine, in front of said pairs, as shown in Fig. 1. Bevel pinion and gear units 34 couple the drive shaft 15, in simultaneous but reverse driving relation with longitudinal shafts 35 which are journaled in connection with, and extend between, each pair of upstanding brackets 33 generally above the housings 4. The longitudinal shafts 35 are driven in a direction such that the bottom portions thereof turn laterally outward relative to the general longitudinal line of the machine. Each of the longitudinal shafts 35 carries the corresponding one of the rotary saw and roller units 31, and as each of the latter is of identical construction, a description of one will suffice for both.

Each rotary saw and roller unit 31 comprises a center block 36 keyed onto the corresponding shaft 35; said block being substantially square in cross section. On opposite sides the center block 36 is fitted with pairs of saddles 37 and 38; these saddles being disposed adjacent the ends of the center block 36 and mounted in connection therewith for adjustment radially of the shaft 35 in the manner shown.

The pair of saddles 37 is connected by a longitudinal attachment plate 39, and a plurality of segmental saw blades 40 are fixed on and project from said plate 39; said plates extending in the direction of rotation and being longitudinally spaced along the plate 39.

On the opposite side of the center block 36 the saddles 38 have a roller 41 extending therebetween in journaled relation and parallel to the shaft 35.

The roller 41 includes a plurality of enlarged presser discs 42 disposed in evenly spaced relation along the roller 41, and in alinement with corresponding ones of the segmental saw blades 40.

The timing of the shafts 35, and consequently the rotary saw and roller units 31, is such that the saw blades 40 sweep across the corresponding ones of each pair of cleats 25, deposited on the top bars 20, when the lid supporting and discharge assembly is at its fully advanced, dead-center position, as previously described.

In Fig. 9 one of the rotary saw and roller units is shown a moment before it engages the corresponding bar-supported cleat for transversely grooving the same; the units 31 each including a plurality of lead shoes 43 corresponding to, alined with, and running in advance of, each segmental saw blade 40. The lead shoes 43 engage each cleat 25 immediately before it is sawed or grooved, whereby to assure that such cleat is properly engaged with the corresponding top bar 20, and a longitudinal backstop 44 immediately prior to the grooving operation. As the lead shoes 43 leave each cleat the following saws immediately begin to bite into such cleat; such saws being slightly eccentric to the path of rotation so that the following operation is progressive in depth of cut.

The backstop 44 which prevents each cleat 25 from being swept off the corresponding top bar 20 in a laterally outward direction by the saws, is constructed and mounted as follows: Laterally outwardly but adjacent each top bar 20, and between the channels 24, there is one of the longitudinal backstops 44 supported at opposite ends for downward yielding but normally raised by spring resisted plunger units 45. As each backstop is in the path of cleats fed to the corresponding top bar 20, said back stop is arcuate on its rear face, as at 46, so that when a cleat is fed onto the top bar it merely engages and depresses the backstop 44 and continues to its position on said top bar. After the cleat is positioned, and its feeding plate 23 retracted, the backstop 44 snaps upward to working position; each such backstop being slotted, as at 47, to permit of free passage of the lead shoes 43, segmental saw blades 40, and the presser discs 42, whose function is hereinafter described.

After the saw blades 40 of the rotary saw and roller units 31 sweep across each top bar-supported pair of cleats, and such saws move laterally outward to clearance position, the crank mechanism—beginning another stroke—works to cause retraction of the lid supporting and discharge assembly 2, including the slide frames 3, and at the same time causes advancing motion of the slat feeding mechanism. With such advancing or forward motion of the slat feeding mechanism 5, a pick 48, on the rear end portion of the table 6, engages the rear edge of one or more slats 49 delivered downwardly from the slat hopper 7 and advances such slats 49 (if two are used, they are in edge to edge relation) forwardly to a position with the ends of such slats above, and directly alined with, the previously grooved cleats resting on the top bars 20. The pair of cleats 25 resting on the top bars 20 do not retract, with retraction of the top bars 20, as they are engaged by stops 50, and thus remain directly laterally inwardly of the backstops 44.

At the moment that the crank mechanism reaches dead-center with the lid supporting and discharge assembly 2 fully retracted, and the slat feeding mechanism 5 fully advanced, with the advanced slats 49 alined with the top bar-supported cleats 25, as described, the rotary saw and roller units 31 have made such further rotation that the rollers 41 then strike the tops of the slats at the ends thereof, sweeping across said ends with relatively great pressure. When this occurs the presser discs 42 deform tongues 51 from the slats into the cut grooves 32, with close frictional engagement; thus binding, without nailing or gluing, the slats 49 to the top bar-supported pair of cleats 25.

When this pressing operation is completed the machine again begins a further cycle; the completed lid 52 being advanced with the lid supporting and discharge assembly as the same begins its advancing movement of such next cycle. Such advance of the completed lid with the lid supporting and discharge assembly 2 is assured by means of push-out dogs 53 mounted in connection with each top bar 20. The push-out dogs 53 are pivotally mounted so that they may extend above the top bars for the lid advancing operation, but are lowered to a flush operative position upon retraction of the top bars 20, so as to assure against any possible interference with the next pair of cleats fed onto said bars. The push-out dogs 53 are actuated between raised operative position and lowered, inoperative position by a bottom slide plate 54 slid in one direction by a stop pin 55 engaged by said plate at the full advanced position of the assembly 2, and another stop pin 56 engaged by the other end of said plate at the full retracted position of the assembly 2.

As the lid supporting and discharge assembly 2 reaches its fully advanced position, with each cycle of the machine, the completed lids 52 are removed and conveyed away by carry-off means not here shown.

In Figs. 15 and 16 there is illustrated a modified form of the rotary saw and roller unit, indicated generally at 57. Under certain working conditions it may be desired to substitute units of the type shown at 57 in Figs. 15 and 16 for the rotary saw and roller units 31 shown in the other figures of the drawings.

Each of the modified rotary saw and roller units 57 is constructed as follows:

A center block 58 is keyed to the corresponding shaft 35, and on opposite sides includes a pair of end saddles 59 and 60 adjustably mounted in connection with the center block 58 at its ends, just as in the previous embodiment.

Here, however, the saw assembly comprises a rotary shaft 6 journaled in connection with, and extending between, the saddles 59; said shaft having a plurality of circular saw blades 62 adjustably secured thereon. The circular saw blades 62 are driven, at relatively high speed, during rotation of the unit 57 by means of an electric motor 63 mounted on one of the adjacent brackets, and driving a pulley 64, concentric to the shaft 35, through an endless belt and pulley unit 65. In turn another endless belt and pulley unit 66 drives the shaft 61 from pulley 64.

On the opposite side of the center block the saddles 60 support a roller unit comprising a cross shaft 67 having a plurality of presser discs 68 adjustably secured thereon in alinement with corresponding ones of the saw blades 62.

The above described modified form of rotary saw and roller unit functions in the same manner as the previous embodiment, but here the sawing operation can be accomplished more positively, by means of the driven circular saw blades 62. Also, as the blades 62 and discs 69 are adjustable, accurate alinement thereof can be effected.

In Figs. 17 and 18, there is illustrated the slat discharge mechanism which permits the slats to fall from the bottom of the hopper 7, one, or a set, at a time, in predetermined timed relation to travel of the slat feeding mechanism 5. The above slat discharging mechanism comprises, generally, feet 69 which project under the hopper 7 from opposite sides; there being plungers 70 adapted to reciprocate atop the feet 69 in opposed relation; i. e. when one plunger moves inwardly the other moves outwardly. This is accomplished by pivotally connecting the plungers at their outer ends in connection with depending swing links 71, coupled together intermediate their ends by a tie rod 72. This assembly is swung to and fro by a roller and cam unit 73 actuated from a shaft 74 suitably driven in predetermined timed relation to travel of the slat feeding mechanism 5. Upon swinging of the links 71 in one direction, one plunger engages the ends of the bottommost slat (or slats) and pushes the same off the corresponding feet 69; the thus freed end of the slat (or slats) dropping down onto the rear end portion of the adjacent longitudinal guide housing 4. With reciprocation or swinging of the links 71 in the opposite direction, the other plunger 70 pushes the opposite end portion of the bottommost slat (or slats) off its feet 69, whereby said slat (or slats) then falls free onto the table 6 of the feeding platform for advancing movement.

With the slat (or slats) thus delivered to the slat feeding mechanism 5, said slat (or slats) go forward for deposit onto a pair of end cleats, and for connection therewith, all in the manner previously described.

The box lid forming machine which is the subject of this invention provides a wholly automatic, convenient, practical, and relatively high-speed arrangement for the fabrication of box lids from initially separate end cleats and slats.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. In a box lid making machine a horizontal, longitudinal support for a cleat, and a driven rotary saw and presser unit mounted lengthwise of and in position above said support operative, upon each rotation of the unit, to saw transverse grooves in a cleat exposed on the support, and to then depress tongues from a slat into said grooves, the slat being placed on the cleat after grooving thereof; said unit comprising a driven center shaft, a body member on said shaft, a saw assembly projecting from the body member and including a plurality of spaced saws, and a presser roller assembly mounted on the body in circumferentially spaced relation to the saw assembly and including a plurality of presser discs alined with corresponding saws.

2. A machine for making a box lid which consists of spaced end cleats and intermediate slats attached to the cleats, such machine comprising a frame, a support on the frame for supporting a pair of end cleats, power driven saw means mounted adjacent the support and being operative to cut transverse grooves in cleats disposed on said supporting means, and power operated presser means mounted adjacent the support and functioning in timed relation with respect to the saw means and operative to engage slats disposed on the cleats and depress portions of the slats into the grooves in the cleats.

3. A machine for making a box lid which consists of spaced end cleats and intermediate slats attached to the cleats, such machine comprising a frame, a structure on the frame for supporting a pair of end cleats, means to cut a plurality of transverse grooves in end cleats disposed on said supporting means, and means functioning subsequent to the cutting means and effective to act on slats disposed on the end cleats and depress portions of said slats into the grooves in the cleats.

4. A machine for making a box lid which consists of spaced end cleats and intermediate slats attached to the cleats, such machine comprising a frame, a support on the frame adapted to support a pair of end cleats, cleat supply means, a feed device operative to advance cleats from the cleat supply means onto the support, saw means supported adjacent the support and operative to cut transverse grooves in the cleats on the support, slat supply means, a feed device operative to advance slats from the slat supply means and deposit them on the grooved cleats, and presser means supported adjacent the support and operative to press portions of the slats into the grooves in the cleats.

5. A machine for making a box lid which consists of spaced end cleats and intermediate slats attached to the cleats, such machine including a supporting frame, a pair of transversely spaced apart top bars, means for reciprocating said bars in guided relation on the frame between a rear position and a forward position, a cleat supply means, feed means acting in timed relation with respect to the movement of the top bars to feed a cleat from said cleat supply means onto each top bar as the latter move to their forward position, saw means mounted adjacent the support in position and operative to cut transverse grooves in the cleats as the latter rest on said top bars, a slat supply means mounted on the frame and, feed means operative to feed slats from said slat supply means onto said cleats after the grooves are cut therein, and presser means mounted adjacent the support in position and operative to engage the slats and press portions of the latter into the said grooves after the slats have been positioned on the cleats whereby to secure the slats and cleats together to form the lid.

6. A machine for making a box lid which consists of spaced end cleats and intermediate slats attached to the cleats, such machine including a supporting frame, a pair of transversely spaced apart top bars adapted to reciprocate between a rear and a forward position, means to move the bars from the rear to the forward position, a cleat supply means, a feed means operative in timed relation with respect to the bar moving means and effective to move a cleat onto each bar as the bars move to the forward position thereof, saw means operative to cut transverse grooves in the cleats as they rest on the bars, means to retract the bars beneath the cleats to the rear position and effective to bring the bars to rest in such rear position with the cleats disposed adjacent the forward ends of the bars, a slat supply means, feed means operative to feed slats from the slat supply means onto said cleats after the grooves are cut therein, presser means operative to engage the slats and press portions of the latter into said grooves after the slats have been positioned on the cleats whereby to secure the slats and cleats together to form the lid, and means on the bars to carry the finished lid forward with the next succeeding forward movement of the bars.

7. A machine as in claim 6 in which the last named means comprises push out dogs held in a position projecting above the surface of the bars and engageable with the lid with the forward movement of the bars, and means to retract the dogs to a position below the top surface of the bars when the latter move rearwardly.

8. A machine as in claim 6 including stop means on the frame to prevent movement of the cleats with the bars as the latter are moving rearwardly.

9. A machine as in claim 6 including means on the frame to prevent lateral movement of the cleats relative to the bars during the cutting of the grooves.

10. A machine as in claim 9 in which the last named means comprises a yieldable stop interposed in the path of movement of the cleats closely adjacent the bars.

11. A machine as in claim 10 in which the stop is provided with a curved surface facing contra to the direction of travel of the cleats.

12. A machine for making a box lid which consists of spaced end cleats and intermediate slats attached to the end cleats, such machine comprising a frame, a supporting means on the frame, a cleat supply means, means to feed cleats in spaced relation onto the supporting means, rotatable members supported on the frame adjacent the supporting means on axes parallel to cleats moved onto the supporting means, a plurality of spaced saws on the members concentric with the axes thereof, means to rotate the members, the saws being movable through cleats resting on the supporting means upon rotation of the members and being effective to cut transverse grooves in such cleats, means to feed slats onto the cleats after the grooves are cut therein, and presser means operative to engage the slats as they rest on the cleats and press portions of such slats into the grooves in the cleats.

13. A machine as in claim 12 in which the presser means comprises a roller mounted on the rotatable member at a point substantially diametrical of the saws, and a plurality of spaced apart presser discs on the roller, each disc lying in substantial alinement with one of the saws.

14. A machine as in claim 13 including diametrically opposed saddles adjustably mounted on the rotatable member, the saws being mounted on one saddle and the roller being mounted on the other saddle.

NEIL A. LEASH.

REFERENCES CITED

The following references are of record in the file of this patent:

UNITED STATES PATENTS

| Number | Name | Date |
| --- | --- | --- |
| 1,471,246 | Daniels | Oct. 16, 1923 |
| 1,491,679 | Daniels | Apr. 22, 1924 |
| 1,859,633 | Rhinevault | May 24, 1932 |
| 1,974,636 | Ambrose | Sept. 25, 1934 |
| 1,977,080 | Newton | Oct. 16, 1934 |
| 2,159,132 | Chalmers | May 23, 1939 |
| 2,204,207 | Coburn | June 11, 1940 |
| 2,291,057 | Paschal | July 28, 1942 |